March 15, 1927. 1,620,926
H. A. TRULLINGER
COASTER WAGON
Filed June 25, 1926   2 Sheets-Sheet 2
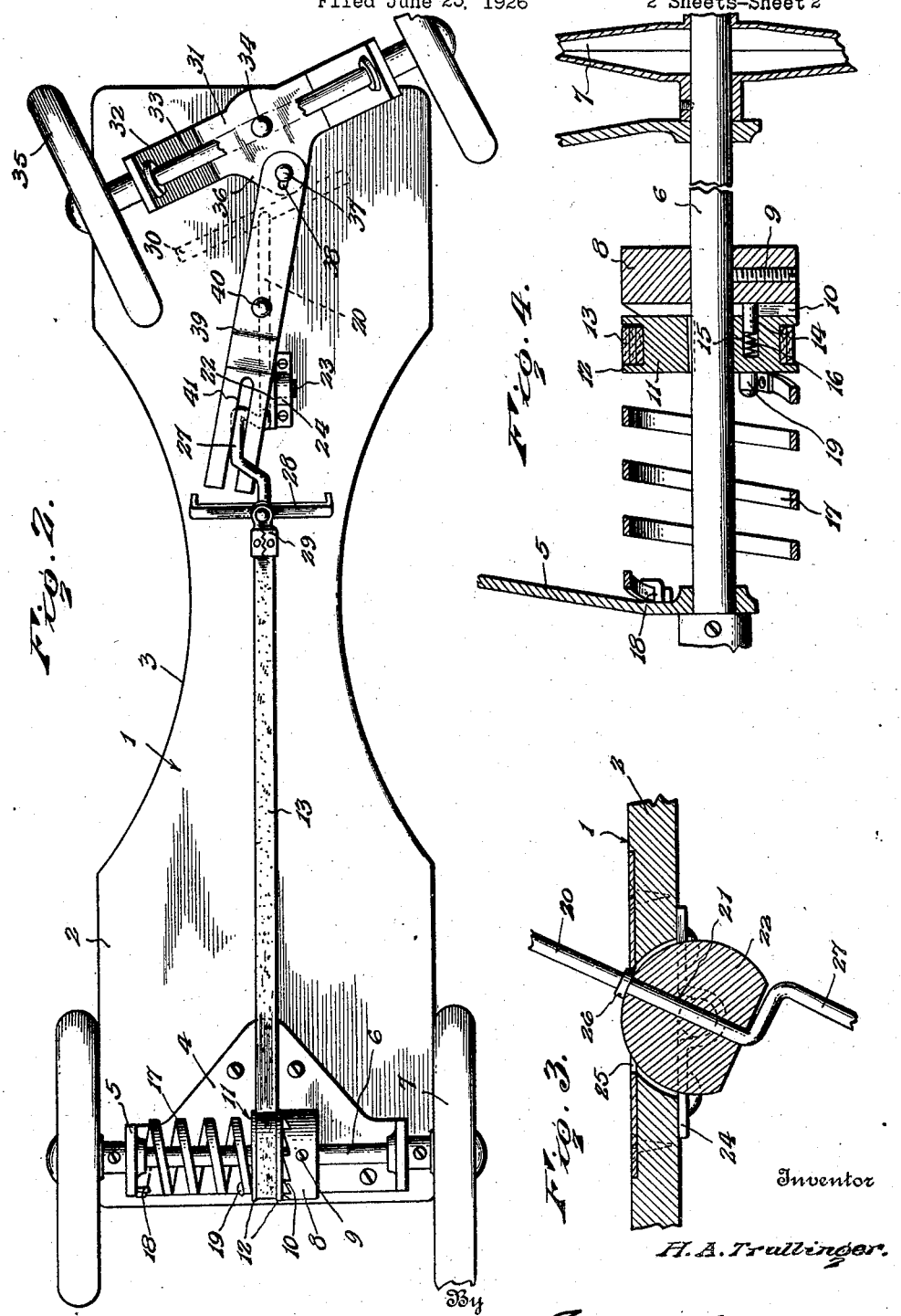
Inventor
H. A. Trullinger.
By Lacey & Lacey, Attorneys Patented Mar. 15, 1927.

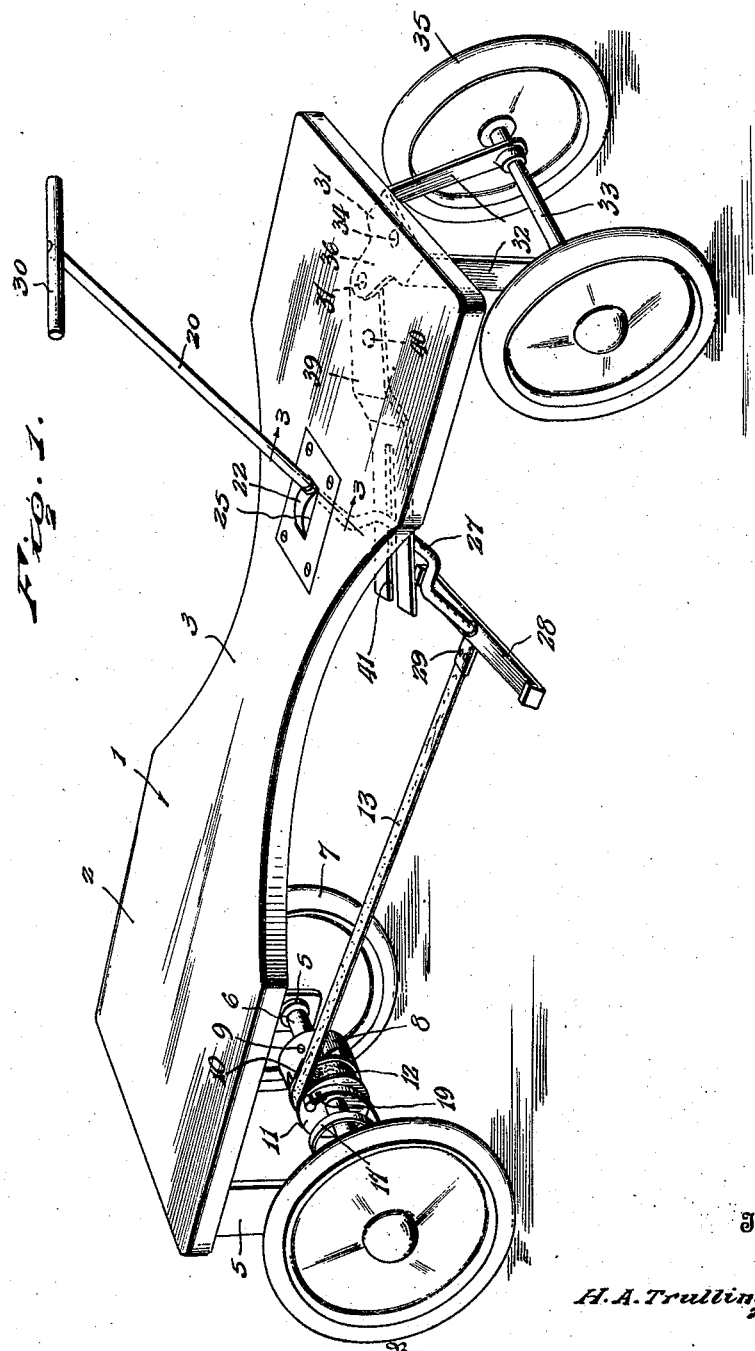

1,620,926

UNITED STATES PATENT OFFICE.

HERBERT A. TRULLINGER, OF CLACKAMAS COUNTY, OREGON.

COASTER WAGON.

Application filed June 25, 1926. Serial No. 118,549.

This invention relates to improvements in coaster wagons such as are designed for use by small boys and one of the objects of the present invention is to provide a coaster wagon which may be more readily propelled and steered than such wagons as ordinarily constructed.

Another object of the invention is to provide a coaster wagon of such construction that it is designed to be propelled by the simultaneous use of the arms and legs so that the child using the wagon is influenced to exercise these members of the body, whereas in the ordinary coaster wagons, the same is either propelled solely by the use of the arms or by the use of the legs.

Another object of the invention is to provide, in a coaster wagon constructed to be propelled both by the arms and the legs, means whereby the propelling device which is operated by the arms is so constructed as to constitute likewise means whereby the wagon may be steered.

Another object of the invention is to provide novel means for transmitting power from the foot and arm actuated means of the wagon to the rear wheels thereof.

In the accompanying drawings:

Figure 1 is a perspective view of a coaster wagon constructed in accordance with the present invention.

Figure 2 is a bottom plan view thereof, the front axle being in a position to steer the wagon to one side.

Figure 3 is a vertical longitudinal sectional view taken substantially on the line 3—3 of Figure 1, on an enlarged scale.

Figure 4 is a vertical sectional view illustrating the means provided for transmitting power to the axle for the rear wheels of the wagon.

The wagon comprises a platform indicated in general by the numeral 1, having a relatively broad rear portion 2 constituting a seat, the body being somewhat narrowed, as at 3, at its intermediate portion, so as to permit of perfect freedom of movement of the legs of the child riding on the wagon.

The numeral 4 indicates a plate or casting which is secured to the under side of the seat portion 2 of the platform, at the rear end thereof, and has downwardly extending bearing members 5 in which is rotatably journaled an axle 6 having wheels 7 mounted thereon. The numeral 8 indicates a clutch member which is secured in any suitable manner, as at 9, upon the axle 6, and is provided upon one face with radial beveled teeth 10. A drum 11 is loosely mounted upon the said axle so as to be freely rotatable thereon and is preferably provided with spaced peripheral flanges 12, a strap 13 being secured at one end to the drum and being wound about the periphery thereof between the said flanges and connected, in a manner to be presently explained, with the manually operable means for propelling the wagon. The numeral 14 indicates a pin which is slidably seated in a socket 15 provided in that face of the drum 11 which opposes the toothed face of the clutch member 8, and a spring 16, which is seated in the socket, behind the said pin, serves to normally project the pin into engagement with the teeth 10, thus connecting the clutch member 8 for rotation in one direction with the drum 11 and permitting of reverse rotation of the drum without interference on the part of the clutch member 8, to rewind the strap 13, the end of the pin, in the reverse rotation of the said drum, riding over the beveled sides of the teeth 10. Such reverse rotation of the drum 11 to rewind the strap 13 thereon, is effected through the medium of a coil spring 17 which is connected at one end, as at 18, with one of the bearing members 5 and at its other end, as at 19, to the adjacent face of the drum 11, the spring being located between the said bearing member 5 and the said drum and surrounding the axle 6. At this point it will be understood that when a pull is exerted in a forward direction upon the strap 13, the pin 14 will engage the teeth 10 of the clutch member 8 and rotary motion will be imparted to the axle 6. It will also be understood that in such rotative movement of the drum 11, the spring 17 will be wound and that when the strap is relieved of the pull exerted thereon, the spring 17 will immediately act to reversely rotate the drum to rewind the strap thereon, the pin 14 at such time riding freely over the beveled faces of the teeth 10 of the clutch member 8.

The manually operable means for transmitting power to the axle 6 includes a lever 20 which is rotatably mounted in an opening 21 formed radially in a segmental bearing 22 provided with trunnions 23 journaled, as at 24, upon the under side of the platform 1 near the forward end of the narrowed portion 3 thereof, the said bearing 22 being accommodated at its upper portion in a slot 25 formed in the said portion of the platform. A collar 26 is provided upon the lever 20 and prevents downward movement of the lever through the opening 21, and below the under side of the bearing 22, the lever is provided with a forwardly directed offset 27 constituting a crank which coacts with a member of the steering mechanism as will presently be explained. The lower end of the lever 20 supports a foot bar 28, and the forward end of the strap 13 is connected in any suitable manner, as for example by a clamp 29, to the lower end of the lever beneath the said bar 28. A handle bar 30 is provided at the upper end of the lever and it will now be evident that by grasping the handle bar and placing the feet upon the foot bar 28, a rearward pull may be exerted upon the upper portion of the lever and a forward thrust exerted by the feet against the lower portion of the lever so as to effect rocking of the same with its bearing 22 in a manner to exert a forward pull upon the strap 13, thus imparting rotary motion to the drum 11 to, in turn, impart rotary motion to the axle 6 and propel the wagon in a forward direction, the return movement of the lever being an idle movement and slackening the strap 13 so as to permit of its being rewound upon the said drum 11 in the manner previously explained. Thus, by a forward and backward oscillation of the lever, substantially continuous motion is imparted to the axle 6 and the wagon is propelled.

The numeral 31 indicates a bolster which is provided with downwardly diverging bearing members 32 in which is rotatably mounted the front axle of the wagon, indicated by the numeral 33, the bolster being swiveled, as at 34, to the under side of the platform 1 at the front end thereof. Wheels 35 are mounted upon the ends of the axle 33 outwardly of the bearing members 32. Rearwardly of the swivel 34, the bolster is provided with a rearward extension 36 carrying a pivot bolt or stud 37 working in a short slot 38 formed in the forward end of a lever 39 which is swiveled intermediate its ends, as at 40, upon the under side of the platform 1 in front to rear alinement with the swivel 34. The rear portion of the lever 39 is extended downwardly and thence rearwardly and this portion is formed with a slot 41 in which the crank portion 27 of the lever 20 works, it being evident, by reference to the drawings, that by rotating the lever 20 through the medium of the handle bar 30, the crank portion 27 thereof will be swung to the right or to the left, so as to effect swinging movement of the lever 39 and a swiveling of the bolster to vary the position of the front wheels and thus direct the course of travel of the wagon. It will now be seen that the lever 20 constitutes not only means manually operable to impart a forward pull to the strap 13 to effect propulsion of the wagon but also constitutes a steering means.

Having thus described the invention, what I claim is:

1. A wagon comprising a body, propelling and steering wheels thereon, a rocking element, an operating lever pivotally mounted in the rocking element and having a crank portion, connecting means between the crank portion of the lever and the steering wheels, connecting means between the said lever and the propelling wheels, and a foot bar carried by the said lever to admit of the latter being operated both by foot and hand.

2. In a coaster wagon, a body, running gear including a rear axle and wheels thereon, a drum rotatably mounted upon the said axle, a clutch member fixed upon the axle beside the drum and having radial beveled teeth upon its face which opposes the drum, a spring projected pin carried by the drum and coacting with the teeth of the clutch member for connecting the parts for rotation in unison when the drum is rotated in one direction, a lever mounted upon the body, and a flexible element wound upon the drum and connected to the said lever.

3. In a coaster wagon, a body, running gear including a rear axle and wheels thereon for rotation therewith, a swiveled bolster upon the body, a front axle mounted thereon, wheels upon the front axle, a lever mounted upon the body for oscillation and for rotative adjustment, means actuated through oscillation of the lever for imparting rotary motion to the rear axle, and a lever swiveled upon the under side of the body and operatively connected with the said bolster and having a slot therein, the first mentioned lever having a crank working in the slot of the second mentioned lever whereby to effect swiveling adjustment of the bolster upon rotative adjustment of the first mentioned lever.

4. In a coaster wagon, a body, running gear including a rear axle and wheels thereon for rotation therewith, a swiveled bolster upon the body, a front axle mounted thereon, wheels upon the front axle, a lever mounted upon the body for oscillation and for rotative adjustment, means actuated through oscillation of the lever for imparting rotary motion to the rear axle, and a lever swiveled upon the under side of the body and operatively connected with the said bolster and having a slot therein, the first mentioned lever having a crank operatively engaging the second mentioned lever whereby to effect swiveling adjustment of the bolster upon rotative adjustment of the first mentioned lever.

In testimony whereof I affix my signature.

HERBERT A. TRULLINGER. [L. S.]